April 5, 1966 S. J. PESTRITTO ETAL 3,244,123
BAKER'S PEEL AND PROOFING BOARD
Filed May 22, 1963

INVENTORS
SEBASTIAN J. PESTRITTO
ANTHONY C. PESTRITTO
BY CALOGERO V. PESTRITTO

Millman and Jacobs
ATTORNEYS.

United States Patent Office 3,244,123
Patented Apr. 5, 1966

3,244,123
BAKER'S PEEL AND PROOFING BOARD
Sebastian J. Pestritto, 1819 43rd St., Pennsauken, N.J., and Anthony C. Pestritto, 534 Malibu Drive, and Calogero V. Pestritto, 525 Fresno Court, both of Magnolia, N.J.
Filed May 22, 1963, Ser. No. 282,384
5 Claims. (Cl. 107—67)

This invention relates to boards used by bakers in hearth baking and particularly to a baker's peel and proofing board used for handling preformed bread dough in the processing operations up to the insertion of dough onto an oven hearth.

The hearth baking process is generally a preferred one from the standpoint of the quality of baked goods such as breads and rolls that are obtained thereby. However, it is an expensive process since it does not lend itself to convenient handling and to automatic machinery as do pan-baked goods. The traditional method of preparation for the hearth baking is one of forming the bread dough and placing it on a flat board, and carrying the breads through the preliminary processing and proofing stage and thereafter sliding them off the board directly onto the hearth in the oven where they are baked. This use of a flat board makes it difficult to keep the breads in alignment and out of contact when carrying the boards from the molding operation to the proofing operation, and then into the hearth oven. Unless the breads are carefully handled, they tend to slide and roll and become deformed in shape; this is especially true since they are usually formed with a round bottom and the dough is soft and easily jarred out of shape. Unless the breads are kept in alignment and inserted carefully into the oven, they tend to be in contact when baked and do not form the uniform crust that is desired by the consumer.

Due to this traditional flat proofing board system, it is necessary to space the breads quite far apart on the boards which leads to inefficient use of the oven capacity, as well as inefficient use of the proofing rack and proofing room. Moreover, an excessive use of dusting corn meal results, because the board is uniformly dusted, and its space is not efficiently used.

Accordingly, it is among the objects of this invention to provide a new and improved baker's peel and proofing board for hearth baking.

Another object is to provide a baker's peel and proofing board for hearth baking on which breads can be closely spaced and held in alignment and without distortion of shape during the processing operations.

Another object is to provide a new and improved baker's peel and proofing board for hearth baking that can be used with automatic bread manufacturing equipment.

In accordance with an embodiment of this invention, a baker's peel and proofing board is provided with a generally flat rectangular board having a plurality of parallel grooves formed in the face of the board. The grooves are arcuate in cross section and extend the full length of the board opening through the ends thereof. Within each of these grooves a plurality of breads are are aligned and retained out of contact with each other and with the adjacent lines of breads during the handling and processing operations. The breads may be removed from the board onto the oven hearth by sliding them along the grooves through the open ends and directly onto the hearth. Thereby, the rolls are retained in alignment when placed on the hearth and are closely spaced.

In accordance with a feature of this invention, means are provided in association with each of the grooves for positioning the board accurately when conveyed by an automatic conveyor for use with automatic machinery such as a molder-panner.

The foregoing and other objects of this invention, the features thereof as well as the invention itself, may be more fully understood from the following description when read together with the accompanying drawing, in which.

In the drawing, corresponding parts are referenced throughout by similar numerals.

Figure 1:
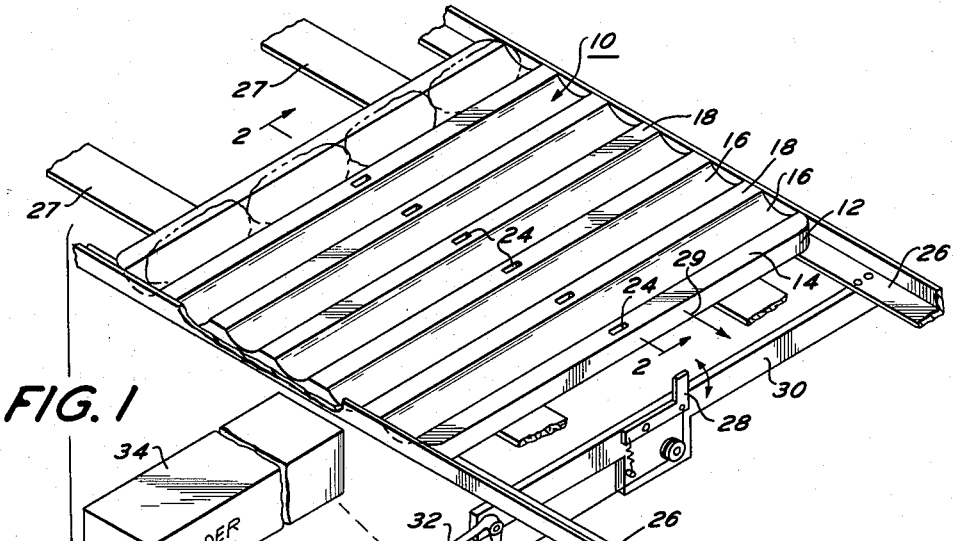
FIG. 1 is a perspective view of a baker's peel and proofing board embodying this invention and mounted on an automatic conveyor.
Figure 2:
FIG. 2 is a sectional view taken along the line 2—2 of FIG. 1.

In the embodiment of FIGS. 1 and 2, a baker's peel and proofing board is made of a flat plywood board 10 of generally rectangular shape. The corners 12 of the board 10 are preferably rounded to avoid chipping thereof, for ease of handling, and to facilitate insertion thereof in racks and trays. The top face 14 of the board has a plurality of arcuate grooves 16 formed therein; the latter extend the length of the board and open through the side edges thereof. Between the grooves 16 are flat sections 18 of the top face 14, which are left ungrooved. The outer grooves at each end of the board are spaced from the respective edges thereof by flat sections 20 of the top face 14.

The grooves 16 are dimensioned to hold a plurality of bread loaves lengthwise therein. Any desired form of hearth baked bread may be positioned on the board within the grooves 16; for example, Italian loaves, French loaves, and the long "submarine" rolls or "hoagie" rolls. Any other type of hearth baked breads (which term "breads" is used herein to include all the various forms of rolls and breads) may be handled with the board 10. The grooves 16 are each dimensioned to provide a width approximately equal to the width of the molded bread loaf 22 so that the loaf is nested therein and there is substantially no overhang onto the flat separator sections 18. The length of the groove 16 is dimensioned to hold any desired number of breads end to end therein from edge to edge, corresponding to the depth of the oven hearth onto which they are ultimately placed.

In one suitable form of board for use with "hoagie" rolls, the board is dimensioned to be 19 inches wide and 24 inches long, with six 2-inch grooves extending along the width separated by 1-inch flat sections 18 and 20. The board is fabricated from half-inch plywood stock with a groove having a $9/16$ inch maximum depth.

In use, the top face of the board and the grooves are dusted with corn meal or the like, and the divided and weighed pieces of dough are molded to the desired form of roll or bread and placed in the grooves 16 end to end. When the board is full of breads, it is placed in a rack, and successive boards are mounted one above the other in this fashion in the rack. The racks are moved into a proofing room and retained therein at a high temperature and high humidity (e.g. 100° F. and 100% humidity).

The grooves 16 retain the breads 22 in alignment and prevent them from sliding along the board as they are moved from place to place. The boards may be moved rather freely without disturbing the breads which are well retained within the grooves 16. There is no need to handle the breads 22 after they have been molded and placed in the grooves since they are not moved and do not have to be realigned as is commonplace with a completely flat board.

After the proofing operation, the boards are removed from the racks and the breads "peeled off" into the oven. This is performed by inserting the board in the oven with an open grooved edge facing therein and sliding the breads off onto the hearth. The grooves 16 guide the bread loaves 22 as they slide off the board 10 and retain the alignment of the breads with the prearranged 1-inch spacing therebetween. The breads are then baked in the conventional manner and may be removed from the hearth in any desired manner. It has been found that a substantial improvement is obtained in the shaping of the rolls and in the uniform smooth-crusted surfaces, as well as in the speed of manual operations.

It has been found that a substantial improvement in space efficiency is attained by means of these boards; as much as 40% increase in the utilization of the board surface and correspondingly in the oven hearth surface. That is, the breads may be more closely spaced on the board both side to side and also end to end without fear of the breads being moved and distorted in shape or pressed into contact with adjacent breads. This efficiency in space results in a more efficient use of dusting corn meal in that the same amount of corn meal is used for a larger number of breads. Similarly, more efficient use is made of the proofing racks and proofing rooms so that a general overall decrease in the cost of baking these breads is attained.

It has also been found that successive boards of these breads can be positioned closer together in the oven due to the assurance that the rolls already on the hearth are properly aligned. It has also been found that the arcuate shape of the grooves 16 retains the molded loaves in their generally rounded shape during the proofing operation, and the bottoms of the loaves tend only to flatten during the baking operation and do not acquire a flattened shape during the proofing operation that might be retained during baking.

The board 10 may be variously dimensioned with different numbers of rows and different lengths to handle as many breads as desired. The length of the boards along the grooves corresponds generally to the depth of the hearth itself, and the width may vary from about 15 inches minimum to 30 inches maximum in view of the ultimate manual handling that is required in placing the breads on the hearth. However, if automatic machinery can be employed for this final operation, then the boards may be made even wider. Different size grooves are used for the different sized breads, with smaller grooves for smaller diameter rolls, and larger grooves for larger breads.

The board 10 is generally symmetrical and may be readily unloaded from either end of the grooves. The flat sections provide sufficient space for them to be held by the baker as well as ensuring close spacing of successive boards of breads placed side by side on the hearth.

Figure 3:
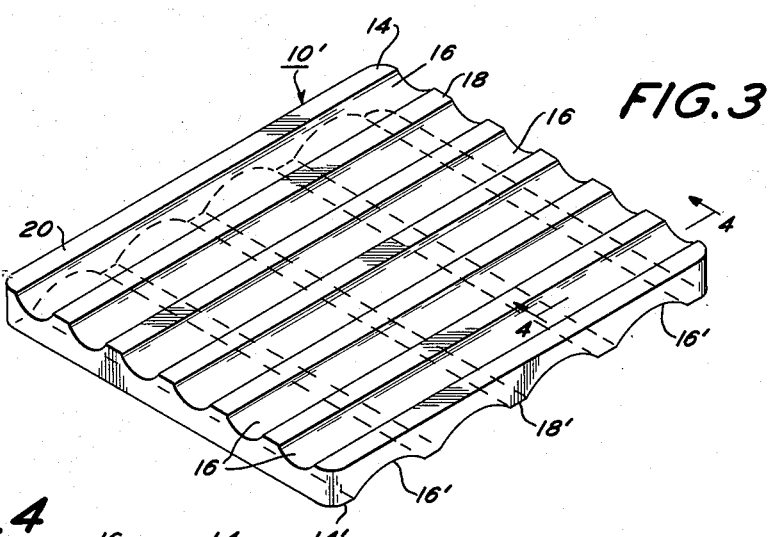
FIG. 3 is a perspective view of a modified baker's board embodying this invention.
Figure 4:
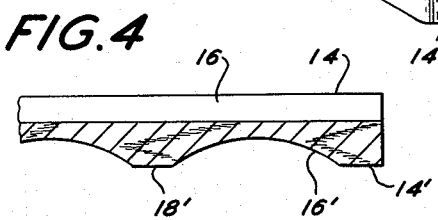
FIG. 4 is a sectional view taken along the line 4—4 of FIG. 3.

In the embodiment of FIGS. 3 and 4 corresponding parts are referenced by the same numerals with the addition of a prime (').

The board 10' is formed of somewhat thicker stock than the board 10; for example, a half-inch board may be used, and 3/16 inch grooves are formed in the top face 14 as well as the bottom face 14'. The grooves 16 in the top face 14 run transversely to the grooves 16' cut into the bottom face 14'. The latter grooves 16' are made wider to handle larger loaves than those handled by the grooves 16. The spacing 18' between the grooves 16' may be the same as that in the top face since the alignment with larger breads is similarly good.

With the arrangement of FIG. 3, the board 10' is adapted to meet the different requirements of the hearth baker. That is, each board 10' is equally adapted for use with small or large breads by choosing either the top or bottom surface thereof. In other respects, the construction of the board 10' is similar to the board 10 and is used in the same fashion. Due to the grooves being relatively shallow, the board is not unduly heavy with the two sets of grooves. Generally, it has been found that more grooves can be obtained by the transverse groove. However, to avoid grooving in a wood board across the grain, both sets of grooves may be in the same direction.

The boards are preferably made out of a marine plywood which has been found suitable for withstanding the high temperatures and to absorb condensation from the high humidity in the proofing room. A suitable means of forming the grooves 16 is by means of a rotating blade having arcuate edges in the form of the ultimate grooved face of the board (the arcuate edges of the cutter being spaced to correspond to the flat sections 18); the board is fed lengthwise through the cutter as it rotates. Any other suitable method of forming the board may be utilized. The choice of materials for the board is not limited to the aforementioned plywood, and other plywoods and other materials may be utilized that are suitable for the high temperatures and high humidities involved in the proofing operation and in the insertion onto the oven hearth. Though certain heat-resistant plastics and metals may be appropriate for this purpose, generally they do not have the advantage of the humidity absorption provided by the plywood, and undesirable water droplets would tend to condense thereon in the proofing operation.

The boards 10 (or 10') of this invention are especially intended for manual use to load hearth ovens of the travelling hearth type. They are also suitable for automatic handling such as by a conveyor in automatic dough-forming and bread-making machinery. As shown in FIG. 1 the board 10 has a plurality of slots 24 formed in each of the flat spacer sections 18 and one section 20. The slots 24 extend through the board from face to face and are centrally located between the grooved edges thereof. The boards 10 are successively mounted to rest under pressure on the shoulders of guide rails 26 and on continuously moving conveyor belts 27. The boards, when not restrained, are moved by the belts 27 in the direction of arrow 29 to pass over a stop pin 28 centrally and pivotally mounted on a cross member 30. The stop pin 28 is periodically actuated by a suitable linkage 32 into a downward position; and when the slots 24 are positioned thereover, it is released to pivot back upwards to engage in the slot and retain the board 10 in that position against movement with the conveyor belts 27. Such conveyor-positioning apparatus is well known in automatic pan baking equipment, and an example of this is an automatic molder-panner 34.

When the stop pin 28 is engaged in a slot 24, the groove 16 immediately following that slot 24 is in position to receive molded dough sections that are dropped therein from the molder. When the molded dough has been deposited in the grooves 16, the stop pin 28 is withdrawn from the slot 24, and the conveyor 27 moves the board the spacing of another groove until the stop pin 28 engages in the next slot 24, and so on. When the last section 20 is over the pin, the board is no longer in position to receive the dough; therefore, no slot 24 is provided, and the molder and stop pin are held inoperative. Such automatic conveyor equipment is well known in the pan baking art, and the boards 10 may readily be used in place of the customary pans. Successive boards may be fed by the conveyor 27 in the same fashion as the pans. Due to the grooves 16, the breads are properly positioned and aligned on the board without interference with each other in a manner similar to that described above. The conveyor 27 may be used to carry the boards of breads on to further automatic operations, or they may be handled by a baker as required in any particular installation.

The slots 24 have been utilized in a conveyor operated board in the manner described. For other types of automatic equipment, suitable positioning means in place of the slots 24 may be provided in the faces thereof or along the edges with the proper spacing to meet the requirements of the automatic equipment. The slots 24 may also be formed in the board 10' in a manner similar to that described above, with the slots being formed either along the edges or along the intersection of a separator 18 and 18'.

It is seen from the above description that a new and improved baker's peel and proofing board is provided which facilitates the processing operations involved in the hearth oven baking of breads. By means of the boards of this invention, greater efficiency of space and baking is provided which decreases the cost of the baking operations. In addition, a better quality product is attained. Moreover, these boards are adapted for use in automatic conveyor equipment which further increases the use thereof and makes possible use of such equipment in the hearth baking process.

What is claimed is:

1. A baker's peel and proofing board for the hearth baking process comprising a generally flat rectangular board of moisture absorbing material and having a plurality of parallel grooves formed in each of opposite faces of said board parallel to first edges thereof, said grooves being arcuate in cross section, extending the full length of said board and opening through the edges thereof transverse to said first edges, and being substantially spaced from adjacent grooves and said first edges by flat sections of said board face, each of said grooves being dimenisioned to hold a bread within the arcuate confines thereof and a plurality of breads along the length thereof, whereby said board loaded with breads aligned within said grooves is handled and carried without substantial movement thereof out of alignment and the breads are retained in substantial alignment when slid off of said board onto an oven hearth, the width of said grooves in each face being the same and different from those in the opposite face.

2. A baker's peel and proofing board for the hearth baking process comprising a generally flat rectangular board of moisture absorbing material and having a plurality of parallel grooves formed in each of opposite faces of said board parallel to first edges thereof, said grooves being arcuate in cross section, extending the full length of said board and opening through the edges thereof transverse to said first edges, and being substantially spaced from adjacent grooves and said first edges by flat sections of said board face, each of said grooves being dimensioned to hold a bread within the arcuate confines thereof and a plurality of breads along the length thereof, whereby said board loaded with breads aligned within said grooves is handled and carried without substantial movement thereof out of alignment and the breads are retained in substantial alignment when slid off of said board onto an oven hearth, the width of said grooves in each face being the same and different from those in the opposite face, and the grooves in opposite faces running in transverse directions.

3. A baker's peel and proofing board for the hearth baking process comprising a generally flat rectangular board having a plurality of parallel grooves formed in a face of said board parallel to first edges thereof, said grooves being arcuate in cross section, extending the full length of said board and opening through at least one of the transverse edges thereof, and being substantially spaced at said transverse edges from adjacent grooves, said board further having a plurality of positioning elements for engaging an automatic conveyor stop to position said grooves successively and predeterminedly in an automatic bread making machine, each of said grooves being dimensioned to hold a bread within the arcuate confines thereof and a pluraliy of breads along the length thereof, whereby said board loaded with breads aligned within said grooves is handled and conveyed automatically without substantial movement of said breads out of alignment and the breads are retained in substantial alignment when slid off of said board onto an oven hearth.

4. A baker's peel and proofing board for the hearth baking process comprising a generally flat rectangular board having a plurality of parallel grooves formed in a face of said board parallel to first edges thereof, said grooves being arcuate in cross section, extending the full length of said board and opening through at least one of the transverse edges thereof, and being substantially spaced from adjacent grooves, said board further having a plurality of positioning elements for engaging an automatic conveyor stop to position said grooves successively and predeterminedly in an automatic bread making machine, each of said grooves being dimensioned to hold a bread within the arcuate confines thereof and a plurality of breads along the length thereof, whereby said board loaded with breads aligned within said grooves is handled and conveyed automatically without substantial movement of said breads out of alignment and the breads are retained in substantial alignment when slid off of said board onto an oven hearth, said grooves being separated by flat sections of said board face, and each of said positioning elements including a different slot in said board at one of said separating sections.

5. In an automatic bread making machine having a conveyor and an automatic stop for positioning a dough carrying member in successive predetermined positions thereon, a baker's peel and proofing board for the hearth baking process comprising a generally flat rectangular board having a plurality of parallel grooves formed in a face of said board parallel to first edges thereof, said grooves being arcuate in cross section, extending the full length of said board, being substantially spaced at said transverse edges from adjacent grooves, and opening through at least one of the transverse edges thereof, said board further having a plurality of positioning elements respectively located adjacent to said grooves for engagement through another surface of said board by said automatic stop, each of said grooves being dimensioned to hold a bread within the arcuate confines thereof and a plurality of breads along the length thereof, whereby said board loaded with breads aligned within said grooves is handled and conveyed automatically without substantial movement thereof out of alignment and the breads are retained in substantial alignment when slid off of said board onto an oven hearth.

References Cited by the Examiner

UNITED STATES PATENTS

| 792,400 | 6/1905 | Corby | 107—67 |
| 1,216,703 | 2/1917 | Kraushaar | 107—67 |
| 2,071,845 | 2/1937 | Kowalski | 107—7.6 |
| 2,101,920 | 12/1937 | Schroeder | 107—67 |
| 2,686,129 | 8/1954 | Seiferth | 107—19 X |
| 2,750,899 | 6/1956 | Marasso | 107—4.3 |
| 3,104,085 | 9/1963 | Skladany | 108—51 X |

FOREIGN PATENTS 1,171,847  7/1960  France.

WALTER A. SCHEEL, *Primary Examiner.*

CHARLES A. WILLMUTH, *Examiner.*

JOSEPH SHEA, *Assistant Examiner.*